US008001420B2

(12) United States Patent
Tenenti

(10) Patent No.: US 8,001,420 B2
(45) Date of Patent: Aug. 16, 2011

(54) END USER CONTROL CONFIGURATION SYSTEM WITH DYNAMIC USER INTERFACE

(75) Inventor: Silvia Tenenti, Rome (IT)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/772,500

(22) Filed: May 3, 2010

(65) Prior Publication Data

US 2010/0218041 A1 Aug. 26, 2010

Related U.S. Application Data

(63) Continuation of application No. 11/811,704, filed on Jun. 12, 2007, now Pat. No. 7,711,984.

(30) Foreign Application Priority Data

Apr. 27, 2007 (EP) .................................... 07425248

(51) Int. Cl.
*G06F 11/00* (2006.01)
*G06F 15/177* (2006.01)
(52) U.S. Cl. ......................................... 714/15; 709/220
(58) Field of Classification Search ............. 379/201.01, 379/201.12; 709/223, 226, 228, 250, 220; 714/4, 15
See application file for complete search history.

(56) References Cited

U.S. PATENT DOCUMENTS

| 5,909,215 A * | 6/1999 | Berstis et al. .................. 715/781 |
| 6,704,030 B1 * | 3/2004 | McDonald et al. ........... 715/736 |
| 6,778,651 B1 * | 8/2004 | Jost et al. ................. 379/201.01 |
| 2002/0194083 A1 * | 12/2002 | Balabhadrapatruni et al. . 705/26 |
| 2003/0172141 A1 * | 9/2003 | Miller et al. ................... 709/223 |
| 2004/0133445 A1 * | 7/2004 | Rajan et al. ........................ 705/1 |
| 2005/0010661 A1 * | 1/2005 | Southam et al. .............. 709/224 |
| 2005/0207553 A1 * | 9/2005 | Fleck et al. .............. 379/201.12 |
| 2006/0059029 A1 * | 3/2006 | Chalasani et al. ................ 705/8 |
| 2006/0085781 A1 * | 4/2006 | Rapp et al. ...................... 716/17 |
| 2007/0050750 A1 * | 3/2007 | Bykov et al. .................. 717/100 |

FOREIGN PATENT DOCUMENTS

WO WO 02/091209 A2 11/2002

OTHER PUBLICATIONS

The State Intellectual Property Office of the People's Republic of China Notification of the First Office Action for corresponding Application No. 200810091282.5 dated Sep. 14, 2010.
The Canadian Intellectual Property Office Examiner Action for corresponding Application No. 2,629,146 dated Jul. 22, 2010.

* cited by examiner

*Primary Examiner* — Andrew Caldwell
*Assistant Examiner* — Jonathan Willis
(74) *Attorney, Agent, or Firm* — Brinks Hofer Gilson & Lione

(57) ABSTRACT

An end user control configuration (EUC) system with dynamic user interface provides a user friendly tool for consumers to self-provision and manage network services such as Voice over Internet Protocol (VoIP) services. The EUC system dynamically generates graphical user interface (GUI) renderings that assist users in the completion of tasks related to provisioning, and managing network services. The EUC system allows telecommunication service providers to effectively hide the complexity of operational support systems (OSS) and the network elements that deliver the network services. The EUC system solves the technical problems of reducing the cycle-time to self-provision network services, assisting users to complete the tasks required to activate, and manage network services, and actually activating and managing the network services.

21 Claims, 10 Drawing Sheets

User Interface Rules File       142

```
- <xsl:stylesheet version="1.0" xmlns:wor="http://..." xmlns:xsl="http://..." xmlns:s="http://...">
- <xsl:template match="/">
- <html>
   <head />
- <body>
- <div style="font-family: Arial;font-size: 10pt;font-weight: normal;font-style: normal;">
- <span style="font-size: 14pt;font-weight: bold;">
   <xsl:text>TO BE MODIFIED ELEMENTS</xsl:text>
   </span>
   <br />
   <br />
- <table align="none" width="100%" border="2pt" cellspacing="1pt" cellpadding="1pt">
- <tbody>
- <xsl:for-each select="xml-fragment/wor:physicalSite">
- <tr bgcolor="yellow">
- <td>
- <div style="text-align: none;">
- <span style="font-weight: bold;">
   <xsl:text>PH. SITE</xsl:text>
   </span>
   <br />
   </div>
   </td>
- <td>
± <div style="text-align: none;">
- <span style="font-weight: bold;">
   <input type="text" name="" />
   </span>
   <br />
   </div>
   </td>
   </tr>
   </xsl:for-each>
   </tbody>
   </table>
   <br />
   </div>
   </body>
   </html>
   </xsl:template>
   </xsl:stylesheet>
```

Fig. 7

END USER CONTROL CONFIGURATION SYSTEM WITH DYNAMIC USER INTERFACE

PRIORITY CLAIM

This application is a continuation of U.S. patent application Ser. No. 11/811,704, filed Jun. 12, 2007, all of which is incorporated herein by reference in its entirety.

BACKGROUND OF THE INVENTION

1. Technical Field

This disclosure concerns a dynamically updating graphical user interface for a management system for provisioning and managing Voice over Internet Protocol (VoIP) Services. In particular, this disclosure relates to an end user control configuration (EUC) system with a dynamic user interface that dynamically generates graphical user interface (GUI) renderings that assist users to complete tasks required to provision or activate, and manage network services, such as IP Multimedia services.

2. Background Information

The telecommunications industry continues to face demands for more services, and rapid deployment of new services, while the complexity of the underlying technologies providing the services continues to increase. Consumers continually push for new VoIP, IP Multimedia (e.g., instant messaging, on-demand recording and play-back, application sharing, audio conferencing, and videoconferencing), and other value added services. The time to market for new IP Multimedia services depends on the systems used to implement the services, and the complexity and maturity of the technology. Reducing the time to market for new network services requires flexible development, integration and provisioning methods. Service providers require systems that allow service providers to rapidly integrate new network services, and provide end users, both residential and commercial consumers, the ability to easily activate and manage the new network services. Deploying new network services requires service providers to address connectivity, data exchange and process integration issues related to the underlying operational support systems (OSS) employed.

Consumers assess network service providers based on the number of available services, the consumers' ease of activation and use of the services. Consumers also recognize the cycle-time between a consumers request for a service and service activation as a dominant market differentiator. Correspondingly, service providers recognize consumers' ability to self-service provision network services as a critical market differentiator.

Unfortunately, the complexity of new operational support systems (OSS) deployed in support of new network services creates technical challenges for service provides desiring to hide the complexity from consumers. The evolution of OSS continues to introduce new complex technologies, in addition to life-cycle maintenance issues. The many technical challenges facing service providers include identifying operational cost reductions, reducing the time to market and time to delivery of services, while improving the consumer's experience related to activating and using services, and minimizing operational impacts resulting from the integration of new OSS with existing systems.

Service providers recognize that many of the technical challenges to providing consumers with the ability to self-provision network services require robust and dynamic user interfaces and workflow solutions. The already immense number of workflow steps required to activate and manage network services increase exponentially with the integration of each new network element, and may require users to complete some number of tasks prior to service activation. Service providers positioned to effectively respond to consumer demands for self-provisioning services require a technical solution that presents users with dynamic workflows, and facilitates integration of the unending number of network elements.

A need has long existed for a management system that hides the complexity of VoIP network services from consumers, and allows consumers to easily request, provision and manage VoIP Services. The end user control configuration (EUC) system with dynamic user interface solves the technical problem of reducing the cycle-time to self-provision network services, and assisting users to complete the tasks required to activate, and manage VoIP services.

SUMMARY

The end user control configuration (EUC) system with dynamic user interface helps to solve the difficult technical problems that service providers face to rapidly introduce new network services to consumers, and allows users to easily self-provision network services, while reducing the costs and time to integrate and manage new network platforms in support of the new services. The end user control configuration (EUC) system with dynamic user interface employs three logical layers, namely, a presentation layer, a business layer and an integration layer to manage user interactions, manage business logic, and deploy and manage network services, respectively. The presentation layer manages the user authentication, user authorization and user interactions with the EUC system. The presentation layer allows the user to input and validate network configuration order information, and activate requested services. The business layer manages business process definitions and business logic execution, and service configurations and activation rules. The integration layer manages the deployment of new network element managers (new OSS), network elements (i.e., provisioned services), and application services providing network services. The three logical layers communicate using a service bus. The service bus performs message brokering and protocol switching in the course of managing communication between the various layers and external systems, which increases the adaptability and stability of each layer. The service bus facilitates orchestration of complex and simple workflows used to support intricate service configurations and near-real time provisioning processes.

The dynamic user interface helps to solve the technical challenges of flexibly provisioning a wide range of complex services, by allowing users to manage tasks related to the activation of services, or system failures, and track requests. For example, a user may use the end user control configuration (EUC) system with dynamic user interface to configure (i.e., perform self-provisioning) or change the class of service or phone service profile. The network technologies involved in support of the user's request may depend on the user's location and the network topology (e.g., two different types of IP Private Branch eXchange (IP-PBX) configurations connected to the network at different locations). Although both IP-PBX configurations provide the same services, each configuration involves different provisioning rules and network elements and application services. The dynamic user interface does not depend on, and is free from constraints that might otherwise rise from, the underlying network topology, and the various network constraints associated with each configuration. The EUC system determines the service configuration requirements and user profile information, and generates appropriate workflows to activate (i.e., provision) the service. In the event the workflows identify tasks for the user to complete prior to service activation, the dynamic user interface presents a dynamically generated graphical user interface (GUI) rendering to the user that includes the tasks, and may present the user with alternative approaches to provisioning the same service.

The end user control configuration (EUC) system with dynamic user interface allows a user's profile authorization to control access to resources and the level of control of services. The EUC system's user authorization may allow a user to provision a service (e.g., associate a phone line to the user) as a result of manually inputting the users name, surname or user ID, or retrieve the user's profile information from a database through a search window, or upload the user's information from an external file. The end user control configuration (EUC) system with dynamic user interface may allow a user to configure, for example, IP-PBX and application services in terms of reduced numerical groups and Private/Public associated numbers, specific users and available telephone services. For example, the end user control configuration (EUC) system with dynamic user interface may summarize ranges of directory numbers configurable to the IP-IBX, and allow the user to define new ranges of directory numbers configurable to the IP-PBX. A user may use the dynamic user interface to select the public numbers to enable from an entire available range reserved for a site, and define the translation rules used between public and private directory numbers to configure reduced numerical groups used for a site.

Following a user's interaction with the dynamic user interface, the business layer manages the execution of the corresponding network elements' service configurations responsible for providing the requested changes to the service (e.g., IP-PBX service). The business layer updates internal service configuration work order parameters, and if tasks require completion prior to service activation, creates a work list and delivers a GUI rendering that includes the work list to the presentation layer. The tasks may include any task requiring user interaction (e.g., system errors, user profile information, or service specific configuration parameters). When a user selects a task from the work list, the presentation layer receives a subsequent GUI rendering containing the appropriate task related data fields, rules and actions. The business layer generates dynamic GUI renderings containing work list tasks until the EUC system recognizes completion of the tasks required prior to service activation.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 7 shows a user interface rule file.

DETAILED DESCRIPTION

Figure 1:
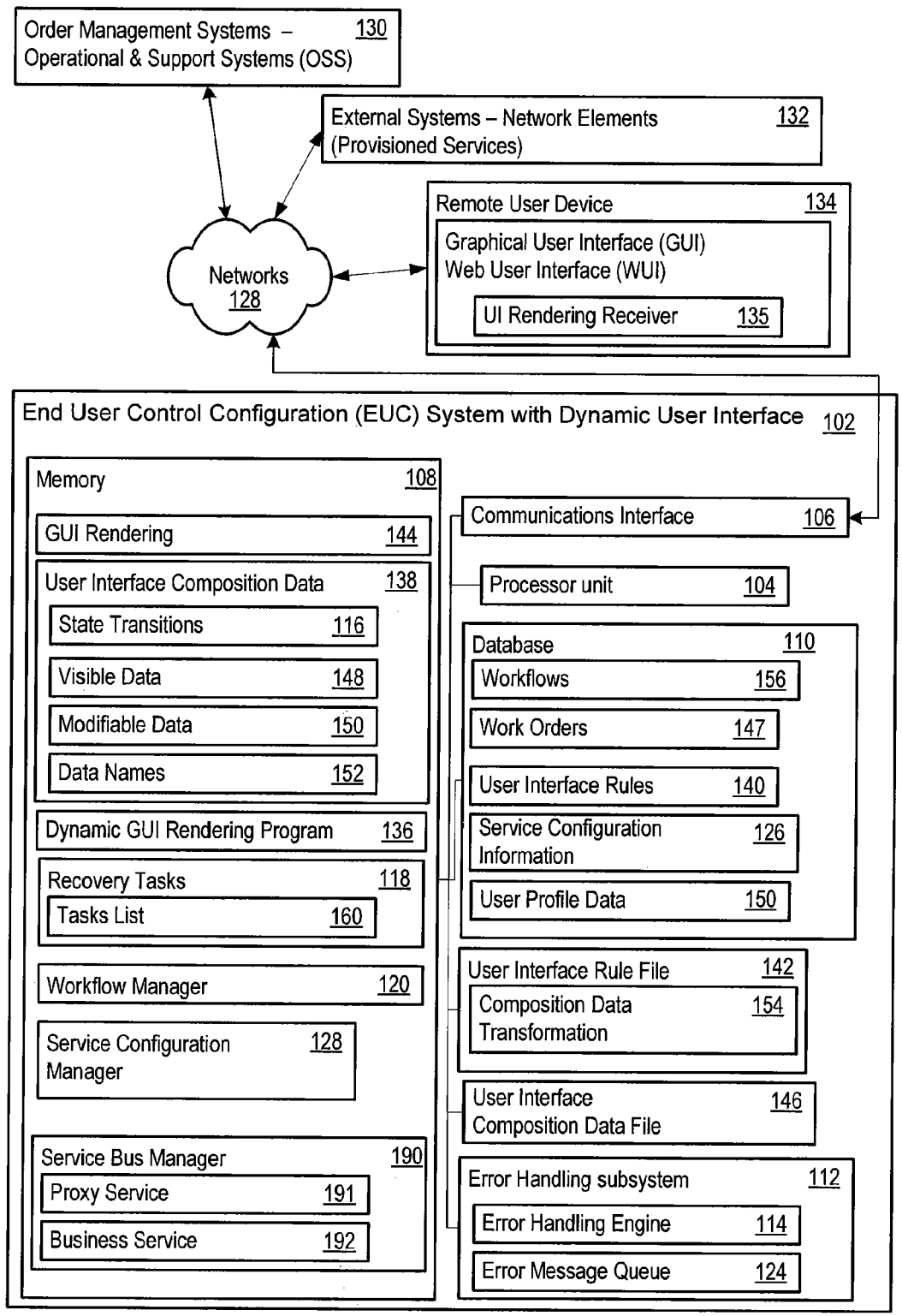
FIG. 1 illustrates an end user control configuration (EUC) system with dynamic user interface.

The end user control configuration (EUC) system with dynamic user interface addresses difficult technical challenges related to hiding the complexity of VoIP network services from consumers, while allowing consumers to easily request, self-provision, and manage VoIP Services. In addition to reducing the cycle-time involved with self-provisioning network services, and assisting users to complete the tasks required to activate, and manage VoIP and IP Multimedia services, the end user control configuration (EUC) system with dynamic user interface isolates error handling, and development of new network platforms. The EUC system reduces the complexity of introducing new network technologies, and eliminates a user's need to understand the complexity of the business processes and network technologies required to activate network services.

The EUC system uses Service Oriented Architecture (SOA) and standard web services (i.e., SOAP, XML and WSDL) to distribute system functionalities between different logical layers, simplify data connectivity, data exchange and process integration. The EUC system uses SOA based software modules to communicate using web services to separate the logical layers to strengthen the ease of introducing new network technologies and services and minimize impacts to systems at integration layer. Employing SOA provides layer separation and component isolation so that each layer may perform parallel development without operational impacts, and thereby, facilitates reduction in the time to market for new network services. The logical layers represent physically distributed systems that may include horizontal and vertical distribution. The EUC system uses vertically and horizontally scalable and reusable processes and services to deploy new network technologies, which lowers integration costs and improves platform performance. The EUC system also uses asynchronous calls (implemented, for example, with Java Messaging Service (JMS) queues) between the business layer and integration layer to reduce hardware resource requirements at the business layer.

In the event the EUC system identifies tasks that may require user interaction to complete prior to service activation, the EUC system generates a work list, and builds a dynamic GUI rendering at run-time, based on information retrieved from a database and context information (e.g., state transition information) identified from previously completed tasks or workflow steps. The EUC system uses state transition information to create a dynamic sequence of workflow steps, and ultimately produces dynamic GUI renderings. The workflow steps include one or more transitions generated as a result of applying rules found in a user interface rule file (e.g., an XSLT—eXtensible Stylesheet Language based file) to data identified in a user interface composition data file (e.g., an XML—eXtensible Markup Language based file). The user interface rules may be combined with the user interface composition data into one file. The business layer manages the user interface rule file and the user interface composition data file that together store information that defines the tasks and sequence of workflow steps to perform to complete each transition, and dynamically compose and format the dynamic user interface (e.g., a JSP—Java Server Page). However, neither the presentation layer nor the business layer need to maintain statically coded permutations of workflow steps, state transitions or static GUI renderings. Instead, the business layer may isolate customizations to the error handling, work list task and workflow steps of the EUC system to the user interface composition data file and the user interface rule file.

The workflow manager, in coordination with the error handling subsystem, generates user recovery tasks and GUI renderings to assist a user to resolve an error or condition requiring user interaction, ultimately resulting in the activation of IP Multimedia services. An example of a recovery task may include a user inputting a code in the WUI received by the user following the completion of a previous task or tasks. The user interface composition data file and the user interface rule file define: the set of visible data; the set of modifiable data; the set of names applied to data used to compose the user interface (GUI rendering); and the transition states. The user interface composition data and user interface rule file maybe modified to customize the dynamic user interface's error handling and tasks list features without requiring programming or development involving other components at the presentation layer, business layer or integration layer.

Furthermore, although specific components of the end user control configuration (EUC) system with dynamic user interface will be described, methods, systems, and articles of manufacture consistent with the system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

FIG. 1 illustrates an end user control configuration (EUC) system with dynamic user interface 102. The EUC system 102 includes a processor unit 104 coupled to a communication interface 106, a memory 108, and a database 110. The EUC system 102 may receive user requests to provision services and manage errors through the communication interface 106 in communication with an error handling subsystem 112. The error handling subsystem 112 includes an error handling engine 114 that responds to workflow process errors. The error handling engine 114 determines state transitions 116 associated with one or more recovery tasks 118 that may require completion before the EUC system 102 may resume an attempt to complete a request or work order. The workflow manager 120 identifies the state transitions 116 from previously completed recovery tasks 118 or workflows 156. The EUC system 102 uses state transition information to create a dynamic sequence of workflow steps, and ultimately produces dynamic GUI renderings 144. The workflow steps 156 include one or more state transitions 116. The EUC system memory 108 may include a workflow manager 120 that retrieves workflow process errors from the error message queue 124, obtains service configuration information 126 for the provisioning task from a service configuration manager 128, analyzes the service configuration information 126 and the workflow process errors, and generates a user interface composition data file 146 specifying a state transition 116 associated with a recovery task 118 for end user completion.

The communications interface 106 receives and transmits, for example, user requests to provision services, and may directly connect to a network 128, such as the Internet. The communications interface 106 may include a keyboard, mouse, or any other communications interface means. The EUC system 102, in one implementation, is capable of communicating with order management systems 130, external systems 132 (i.e., also referred to as network elements or systems delivering provisioned services), and remote user devices 134 (e.g., through the user interface rendering receiver 135) via the communications interface 106.

The EUC system 102 may include a dynamic GUI rendering program 136 that retrieves user interface composition data 138 that specifies the state transition 116, and the user interface rules data 140, and stores the information in memory 108. The user interface composition data 138 and user interface rule file 142 may include information defining recovery tasks 118 to perform to complete a state transition 116, as well as the start and end points of a state transition 116. The dynamic GUI rendering program 136 may generate a GUI rendering 144 based on the user interface composition data 138, and the user interface rules 140 identified in the user interface rule file 142 applied to the user interface composition data identified in the user interface composition data 138. The user interface composition data file 146, or user interface rule file 142, or both files may also establish a GUI rendering's visible data 148, modifiable data 150, and data names 152 used to compose the GUI rendering 144. The user interface composition data file 138, or user interface rule file 142, or both files may also establish the GUI rendering's 144 user interface composition data 138, and state transitions 116.

The dynamic GUI rendering program 136 may generate the GUI rendering 144 by performing a composition data transformation 154 specified in the user interface rule file 142. The composition data transformation 154 may result in the generation of a modified user interface element based on an original user interface element specified in the user interface composition data file 146. In other words, whenever an error occurs that requires a user interaction to complete a state transition 116, a composition data transformation 154 identified in the user interface rule file 142 may be applied to the user interface composition data 138 identified in the user interface composition data file 146.

Figure 2:
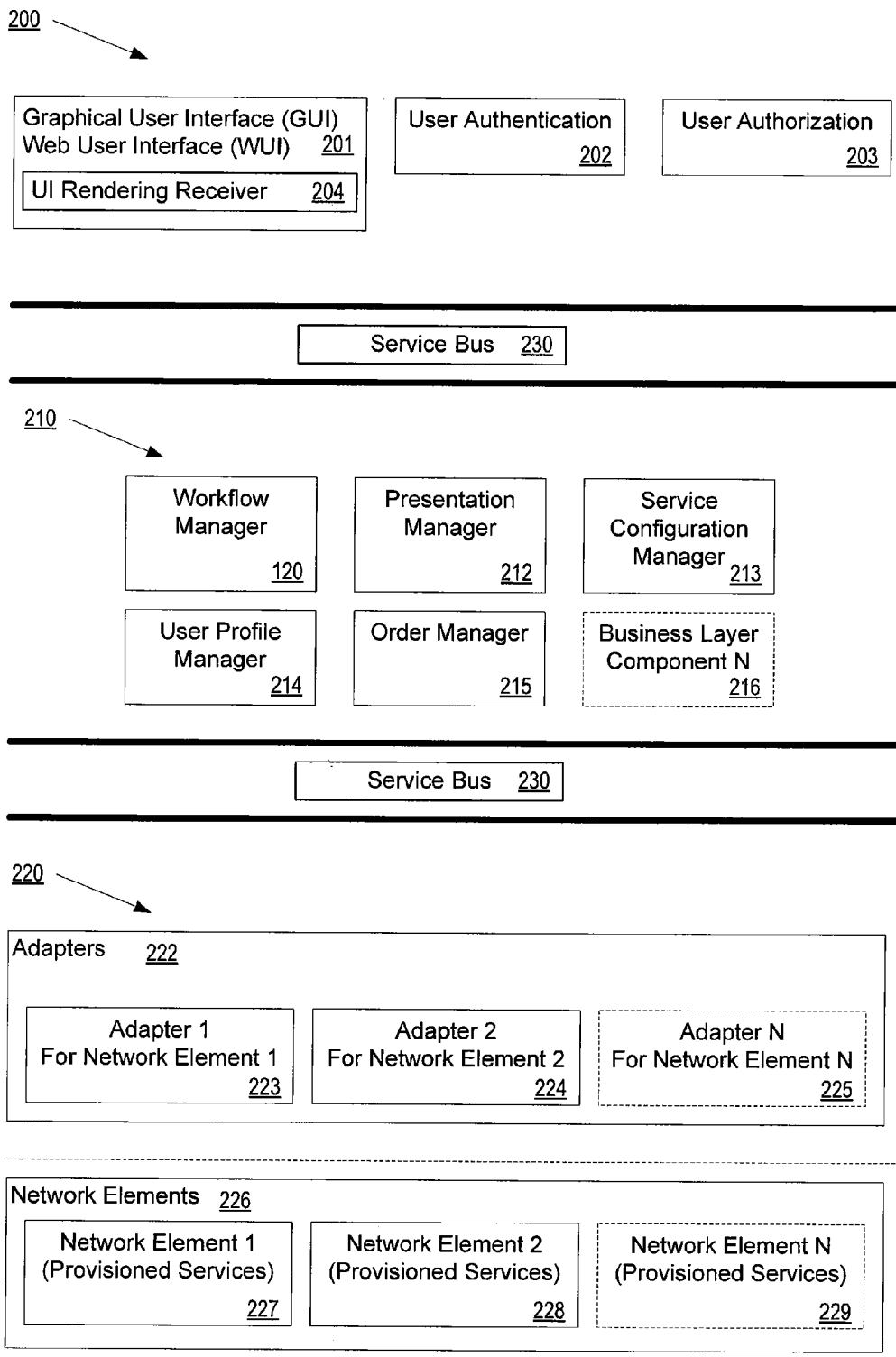
FIG. 2 shows the logical layers of the EUC system configuration.

FIG. 2 shows the logical layers of the EUC system 102. The EUC system 102 includes a presentation layer 200 to manage user interactions, a business layer 210 to manage business logic, and an integration layer 220 to deploy and manage network services. The EUC system 102 also employs a service bus 230, which provides bidirectional communication between the logical layers. The presentation layer 200 manages user interactions, and includes a Web-user Interface (WUI) 201; user authentication 202; and user authorization 203. Presentation layer components may communicate with each other directly without the use of the service bus 230.

Communication between presentation layer components and the business layer components may occur through the service bus 230.

The EUC system 102 uses the WUI 201 to interact with users, for example through a set user interface screens, such as web pages. User interactions with the EUC system 102 occur through the WUI 201. The WUI 201 may employ JPFs (Java Page Flow) and JSPs (Java Server Pages). The WUI 201 JPFs define a set of actions that may be performed during a user's navigation through a series of fields on a particular page or pages. Each WUI JPF action links to a hyper-text markup language (html) form that creates a form bean that stores information used to process the action. For example, the action may validate semantic and syntax on user inputs, or initiate requests to business layer components. Ultimately, the WUI 201 visualizes the results of the WUI JPF action. The WUI 201 communicates directly with other presentation layer components without the use of the service bus 230. Although the WUI 201 may contain presentation specific logic, the WUI 201 accesses business logic at the business layer 210 through communication with the presentation manager 212. The WUI 201 communicates with the business layer 210 through synchronous Web Services (e.g., SOAP/http based—Simple Object Access Protocol and Hypertext Transfer Protocol), but the WUI 201 uses asynchronous communication to process service logic and manage services. Accordingly, the business layer 210 receives service activation requests as work orders 147.

The user authorization 203 component grants access to services or resources, based on a user's profile information retrieved from the business layer 210 through the presentation manager 212 and/or the user profile manager 214. The EUC system 102 caches the user's profile information locally. The user authorization 203 component communicates directly with the WUI 201 through direct web service calls. The user authentication 202 component authenticates users based on user profile information stored in the user profile database at the business layer 210. The user authentication 202 component also communicates with the WUI 201 using direct Java calls.

The business layer 210 contains business logic and processes required to activate and manage services. The business layer 210 manages requests from users, external customer relationship management (CRM) systems, user profile databases, and service configurations, as well as user access logic. The business layer 210 includes: a workflow manager 120; presentation manager 212; service configuration manager 213; user profile manager 214; and the order manager 215. The business layer 210 publishes its services on the service bus 230 and communicates with the presentation layer 200 and integration layer 220 through the service bus 230. The service bus 230 may manage synchronous and asynchronous communication between the business layer components. Alternatively or additionally, the business layer components may communicate with each other using direct JAVA calls for private, synchronous services and interactions. The business layer components also may communicate synchronously with presentation layer components through the service bus 230. The business layer 210 communicates with the integration layer 220 synchronously or asynchronously, depending on the adapter 222, the network elements 226, and the nature of the communication. The service bus 230 manages timeouts and retries that occur during communication between the business layer 210 and the integration layer 220. The network elements 226 may deliver an unlimited array of provisioned services (e.g., instant messaging, on-demand recording and play-back, application sharing, audio conferencing, and videoconferencing, and other value added services) to users.

The workflow manager 120 manages the business layer 210 processes that implement the network services supported by the network elements 226. The workflow manager 120 generates GUI renderings 144 using the following: retrieve the user interface rule file 142; retrieve the user interface composition data 138; identify the state transition 116; generate the tasks lists 160; and generate the GUI rendering 144 and display the tasks list 160. The workflow manager 120 may control the error handling engine 114 and the error message queue 124, which reside in the business layer 210. The error message queue 124 may store error messages arising from exceptions generated during communication between or among components in the presentation layer 200, business layer 210 and the integration layer 220. The workflow manager 120 may include business logic classes (e.g., JAVA classes), and corresponding processes. The EUC system 102 may consider the business logic classes and corresponding processes logically as a single component that physically reside on separate applications on different systems. The workflow manager 120 may communicate with the network elements 226 (e.g., IP Multimedia systems that provide the provisioned network services) through the integration layer 220. The workflow manager 120 may receive work order submissions from the presentation manager 212 and the order manager 215. The workflow manager 120 may use information from the service configuration manager 213 and the user profile manager 214 to determine which processes and workflow steps to activate, or enable or disable, to complete work orders 147. The workflow manager 120 may update work orders 147 while the business layer processes execute, and store work orders 147 on the database 145. The workflow manager 120 may publish an asynchronous interface on the service bus 230 to allow the WUI 201 and order manager 215 to submit work orders 147. The workflow manager 120 also may publish a synchronous interface, dedicated to other business layer components, to retrieve and update work order information. The business layer processes may communicate with the integration layer components through the service bus 230. Table 1 shows an example work order xml file that the workflow manager 120 may receive from the presentation manager 212 and the order manager 215.

TABLE 1 work order.xml

```
<?xml version="1.0" ?>
    <xml-fragment    xmlns:wor="http://xyz.abc.it/
    schemas/workOrder"xmlns:xsi="http://www.w3.org/
    2001/XMLSchema-instance">
<wor:header>
  <wor:olId>1003</wor:olId>
  <wor:statusId>160</wor:statusId>
  <wor:physicalSiteId>3</wor:physicalSiteId>
              <wor:instanceId>[ ]:127.0.0.1-
    418e21b.1109ca490e1.-7c31-gend</wor:instanceId>
  <wor:taskId>127.0.0.1-418e21b.1109ca490e1.-7c49</wor:taskId>
  <wor:timestamp>2007-02-08T15:24:38.000+01:00</wor:timestamp>
  <wor:endDate>2007-02-08T16:33:47.510+01:00</wor:endDate>
  <wor:workFlowName>addIpPbx</wor:workFlowName>
  <wor:tsys>30</wor:tsys>
  <wor:rsys>30</wor:rsys>
  <wor:entityType>entity</wor:entityType>
  <wor:functionType>M</wor:functionType>
  <wor:olAggregate>aggr</wor:olAggregate>
  <wor:olTypeId>addIpPbx</wor:olTypeId>
  <wor:messageType>01</wor:messageType>
  <wor:idWorkFlow>id_flow1</wor:idWorkFlow>
  <wor:olOrder>Ordinativo092374</wor:olOrder>
```

TABLE 1-continued work order.xml

```xml
<wor:nroItem />
<wor:operationType>01</wor:operationType>
    </wor:header>
-<wor:orderInfo>
    <wor:tguPhSite>30</wor:tguPhSite>
    <wor:tguIBS>30</wor:tguIBS>
    <wor:tiPhSite>30</wor:tiPhSite>
    <wor:idSiebelSede>s</wor:idSiebelSede>
    <wor:mnemPhSite>s</wor:mnemPhSite>
    <wor:masterVoIP>Y</wor:masterVoIP>
    <wor:tguSedeMaster />
    <wor:siteIdCRM>30</wor:siteIdCRM>
    <wor:vendor>Vendor ABC</wor:vendor>
    <wor:escapeCodeLocal>301</wor:escapeCodeLocal>
    <wor:escapeCodeOffNet>302</wor:escapeCodeOffNet>
    <wor:escapeCodeOnNet>303</wor:escapeCodeOnNet>
    <wor:reservedDerNum>1</wor:reservedDerNum>
    <wor:numGNR>1</wor:numGNR>
    <wor:singleLineNum>0</wor:singleLineNum>
    </wor:orderInfo>
-<wor:customer>
    <wor:customerId>30563</wor:customerId>
    <wor:corporateName>CORPORATION ABC</wor:corporateName>
    </wor:customer>
-<wor:physicalSite>
    <wor:cfSede>0erererere03</wor:cfSede>
    </wor:physicalSite>
-<wor:physicalSite>
    <wor:physicalSiteId>3</wor:physicalSiteId>
    <wor:physicalSiteType>Y</wor:physicalSiteType>
    <wor:ragioneSociale>Ph Site 30</wor:ragioneSociale>
    <wor:cfSede>0030303</wor:cfSede>
    <wor:physicalSiteName>30</wor:physicalSiteName>
    <wor:addressLocalita>Rieti</wor:addressLocalita>
    <wor:addressIndirizzo>via Garibaldi</wor:addressIndirizzo>
    <wor:addressCivico>234</wor:addressCivico>
    <wor:addressCap>02300</wor:addressCap>
    <wor:addressProvincia>Rieti</wor:addressProvincia>
    <wor:siglaProvincia>RI</wor:siglaProvincia>
    <wor:trNome>Name1</wor:trNome>
    <wor:trCognome>Name2</wor:trCognome>
    <wor:trTelefono />
    <wor:trCellulare />
    <wor:trMail>name1.name2@companyabc.it</wor:trMail>
    <wor:trFax />
    <wor:trIndirizzo />
    <wor:trLocalita />
    <wor:trProvincia />
    <wor:trCap />
    <wor:interoperabilita>No</wor:interoperabilita>
    <wor:administrativeZone>C1</wor:administrativeZone>
    <wor:additionalInfo />
    <wor:codUtSede>303</wor:codUtSede>
    <wor:tguSedeMaster />
    <wor:siteIdCRM>30</wor:siteIdCRM>
    <wor:tguPhSite>30</wor:tguPhSite>
    <wor:cmmSite>site__oxe</wor:cmmSite>
    </wor:physicalSite>
-<wor:logicalSite>
    <wor:logicalSiteId>1001</wor:logicalSiteId>
    <wor:type>GNR</wor:type>
    <wor:name>30092374</wor:name>
    <wor:siteId>32</wor:siteId>
    <wor:publicIpAddress>10.10.10.10</wor:publicIpAddress>
    <wor:mandatoryCos>All-Mobile</wor:mandatoryCos>
    <wor:districtCode>030</wor:districtCode>
    <wor:districtName>Roma</wor:districtName>
    <wor:sessionDirectorId>1</wor:sessionDirectorId>
    <wor:northIf>1</wor:northIf>
    <wor:qsig>1</wor:qsig>
    <wor:nonQsig>1</wor:nonQsig>
    <wor:additionalInfo />
    <wor:rangeSize>4</wor:rangeSize>
    <wor:firstExDirNumber>0923740001</wor:firstExDirNumber>
    <wor:firstIntDirNumber>0001</wor:firstIntDirNumber>
    </wor:logicalSite>
-<wor:ipPbx>
    <wor:ipPbxId>1000</wor:ipPbxId>
    <wor:ipPbxType xsi:nil="true" />
    <wor:location>30</wor:location>
    <wor:vendor>Vendor ABC</wor:vendor>
    <wor:model>Vendor ABC Uno Model</wor:model>
    <wor:publicIpAddress>10.10.10.10</wor:publicIpAddress>
    <wor:hostName>Hostname</wor:hostName>
    <wor:ipAddressVIanCustomer>10.10.10.10
    </wor:ipAddressVIanCustomer>
    <wor:operatingSystem>Unix</wor:operatingSystem>
    <wor:numberInventory>10</wor:numberInventory>
    <wor:serialNumber>1234</wor:serialNumber>
    <wor:release>1</wor:release>
    <wor:description />
    <wor:additionalInfo />
    <wor:nodeNumber>1</wor:nodeNumber>
    <wor:network>1</wor:network>
    <wor:subnetwork>1</wor:subnetwork>
    <wor:nodeName>Node=1</wor:nodeName>
    <wor:networkName>Network=1</wor:networkName>
    <wor:subnetworkName>Subnetwork=1</wor:subnetworkName>
    <wor:profileDirectoryNumber>1234567</wor:profileDirectoryNumber>
    <wor:auxiliaryServerFramework>FWABC
    </wor:auxiliaryServerFramework>
    <wor:auxiliaryServerOv4760>ABC AuxSrv
    </wor:auxiliaryServerOv4760>
    </wor:ipPbx>
-<wor:ftpConfig>
    <wor:ftpUsername>user</wor:ftpUsername>
    <wor:ftpPassword>password</wor:ftpPassword>
    <wor:snmpRead>prova</wor:snmpRead>
    <wor:snmpWrite>prova</wor:snmpWrite>
    <wor:snmpReadConfirm>prova</wor:snmpReadConfirm>
    <wor:snmpWriteConfirm>prova</wor:snmpWriteConfirm>
    </wor:ftpConfig>
-<wor:gnrs>
    <wor:gnrId>1001</wor:gnrId>
    <wor:serviceTypeGNR>90</wor:serviceTypeGNR>
    <wor:gnrDistrict>030</wor:gnrDistrict>
    <wor:gnrPhone>092374</wor:gnrPhone>
    <wor:reservedDerNum>1000</wor:reservedDerNum>
    <wor:cac>30</wor:cac>
    <wor:siteIdLogico>30</wor:siteIdLogico>
    <wor:lowerBound>3000</wor:lowerBound>
    <wor:upperBound>3030</wor:upperBound>
    <wor:numCanaliQSIG>30</wor:numCanaliQSIG>
    <wor:localArea>area30</wor:localArea>
    <wor:routingNumber />
    <wor:tnui>301</wor:tnui>
    <wor:cnui>302</wor:cnui>
    <wor:pbsts>pbsts</wor:pbsts>
    <wor:domainId>600</wor:domainId>
    <wor:siteId>2</wor:siteId>
    <wor:range>39092374XXXX</wor:range>
    <wor:digit>4</wor:digit>
    <wor:prefixTranslate>6002XXXX</wor:prefixTranslate>
    <wor:prefixPostTranslate>39092374</wor:prefixPostTranslate>
    <wor:tradLowerBound>0000</wor:tradLowerBound>
    <wor:tradUpperBound>9999</wor:tradUpperBound>
-<wor:msemInfo>
    <wor:msempAclId>300</wor:msempAclId>
    <wor:imsspAclId>301</wor:imsspAclId>
    <wor:moduloVTCH1pi>304</wor:moduloVTCH1pi>
    <wor:portaVTCH1pi>305</wor:portaVTCH1pi>
    <wor:moduloVTCH2pi>306</wor:moduloVTCH2pi>
    <wor:portaVTCH2pi>307</wor:portaVTCH2pi>
    </wor:msemInfo>
-<wor:msemInfo>
    <wor:msempAclId>302</wor:msempAclId>
    <wor:imsspAclId>303</wor:imsspAclId>
    <wor:moduloVTCH1pi>308</wor:moduloVTCH1pi>
    <wor:portaVTCH1pi>309</wor:portaVTCH1pi>
    <wor:moduloVTCH2pi>300</wor:moduloVTCH2pi>
    <wor:portaVTCH2pi>301</wor:portaVTCH2pi>
    </wor:msemInfo>
    </wor:gnrs>
```

TABLE 1-continued work order.xml

```
-<wor:ipVoip>
    <wor:nameSD>s</wor:nameSD>
    <wor:ipAddressSD>s</wor:ipAddressSD>
    <wor:subnetSD>s</wor:subnetSD>
    <wor:ipAddressDHCP>s</wor:ipAddressDHCP>
    <wor:subnetDHCP>s</wor:subnetDHCP>
    <wor:ipAddressCMM>s</wor:ipAddressCMM>
    <wor:subnetCMM>s</wor:subnetCMM>
    <wor:numServerCMM>89</wor:numServerCMM>
    <wor:ipLanNetwork>s</wor:ipLanNetwork>
    <wor:codeIPCX>s</wor:codeIPCX>
    <wor:ipLanSubnetMask>s</wor:ipLanSubnetMask>
        </wor:ipVoip>
-<wor:option>
    <wor:optionType>s</wor:optionType>
    <wor:optionValue>s</wor:optionValue>
        </wor:option>
        </xml-fragment>
```

The presentation manager 212 may manage requests from the presentation layer components, and either responds directly to each request or invokes other business layer components to complete each request. The service configuration manager 213 may manage service configuration and consistency information. The workflow manager 120 may invoke the service configuration manager 213 to retrieve information that identifies the workflows to activate, the network elements 226 and service specific parameters required, and update service consistency information on the database 145. The user profile manager 214 may manage EUC administrators' application profiles and end user service profiles, access to internal users' profiles and service profiles database, and may communicate with the network elements 226 responsible for user identity and access management. The order manager 215 may manage communication with one or more of the network elements 226 (i.e., provisioned network elements). The workflow manager 120 may send work orders 147 to one or more provisioned network elements 226, after having interacted with order manager 215 and having validated each work order 147.

The integration layer 220 may manage communication between the business layer components and the network elements 226. The integration layer 220 may use adapters 222 (i.e., web services), to communicate with the network elements 226 to provision and manage services. Each network element 226 communicates with the integration layer 220 through a dedicated adapter. Each adapter 222 may process multiple simultaneous requests, and a single request from the business layer 210 or another adapter may cause the adapter 222 to forward multiple requests to the corresponding network elements 226. For example, where business layer 210 requests a service from network element 228, through service bus 230, adapter 224 may forward multiple requests to network element 228 to complete the business layer 210 request. Each adapter 222 may publish its interface (i.e., service) on the service bus 230, and communicate synchronously or asynchronously via a call-back interface. The adapters 222 use document based interfaces (XML files) designed to hide the complexity of the external systems. The business layer 210 and adapters 222 at the integration layer 220 communicate based on SOAP/http and XML. Each adapter 222 receives a request from a business layer component; transforms the request (XML based) into a set of requests to the corresponding external system; calls the external system's APIs (Application Program Interfaces) and waits for a response; aggregates the information retrieved while processing the XML document (request); and returns the results back to the business layer 210. During synchronous communication, the adapter 222 returns the result in an http response to the initial web service call. During asynchronous communication, the adapter 222 returns the result to the business layer 210 via a call-back towards a dedicated Web Service. During asynchronous communications the adapter 222 returns an immediate acknowledgement to the business layer 210 upon a valid business layer 210 request, or an error message if the EUC system 102 cannot process the request (e.g., an invalid request, a full input queue, an external system unavailable message, or an external system error message).

The service bus 230 may manage communications between the presentation layer 200, business layer 210 and integration layer 220. The service bus 230 hides the network complexity of managing and provisioning network services, facilitates isolated development and testing of components at each layer, and thereby improves service deployment time and service levels. The service bus 230 may provide protocol switching, content routing and message transformation functionalities. The service bus 230 may manage communication between the business layer components, either synchronously (SOAP/http) or asynchronously (JMS). The service bus 230 may manage timeouts and retries that occur during communication between the business layer 210 and the integration layer 220, and call-backs from the integration layer 220 to the business layer 210. When a request (call) from a business layer component to an adapter 222 times out while waiting for an acknowledgement from the adapter 222, the service bus 230 may automatically resend the request (call) for a configurable number of times. When an asynchronous response (call-back) from an adapter 222 to the business layer 210 times out, the adapter 222 may automatically resend the response back to the business layer 210 for a configurable number of times. The adapters 222 also manage time outs and retries that occur while in communication with the network elements 226, a configurable number of times.

Figure 3:
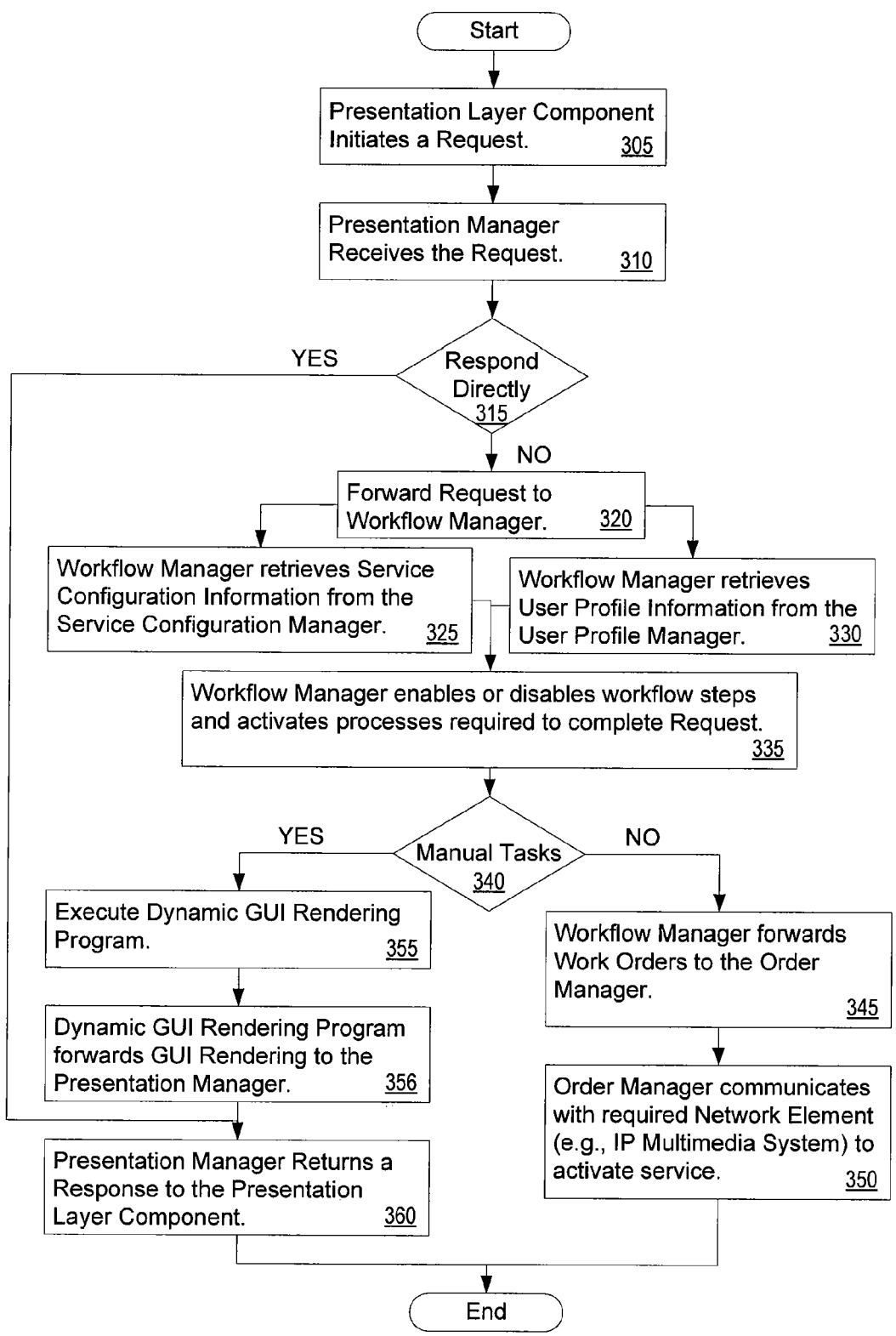
FIG. 3 illustrates the Interactions between the logical layers.

FIG. 3 illustrates the interactions between the Logical Layers. When one of the presentation layer components initiates a request (Act 305), the presentation manager 212 receives the request (Act 310) and may respond directly to the request (Act 315) or forward the request to the workflow manager 120. If the presentation manager 212 responds directly to the request the presentation manager 212 may return a response to the presentation layer component (Act 360). In the event the presentation manager 212 forwards the request to the workflow manager 120 (Act 320), the workflow manager 120 retrieves service configuration information from the service configuration manager 213 (Act 325), and user profile information from the user profile manager 214 (Act 330). The workflow manager 120 may use information from the service configuration manager 213 and the user profile manager 214 to determine which processes and workflow steps to activate, or enable or disable, to complete the request (Act 335).

In the event the workflow manager 120 does not identify recovery tasks 118 to complete before completing the request (Act 340) then the workflow manager 120 may forward work orders 147 to the order manager 215 (Act 345). The order manager 215 may process the work orders 147 received from the workflow manager 120, and the workflow manager communicates with one or more network elements 226 to activate the requested service (Act 350). In the event the workflow manager 120 identifies recovery tasks 118 that may require completion before completing the request (Act 340) then the workflow manager 120 may initiate execution of the dynamic GUI rendering program 136 (Act 355). Once the dynamic GUI rendering program 136 completes generation of the GUI rendering 144, the dynamic GUI rendering program 136 forwards the GUI rendering 144 to the presentation manager 212 (Act 356). The presentation manager 212 returns the GUI rendering 144 to the presentation layer component (Act 360) where the GUI rendering 144 is presented in the WUI 201.

Figure 4:
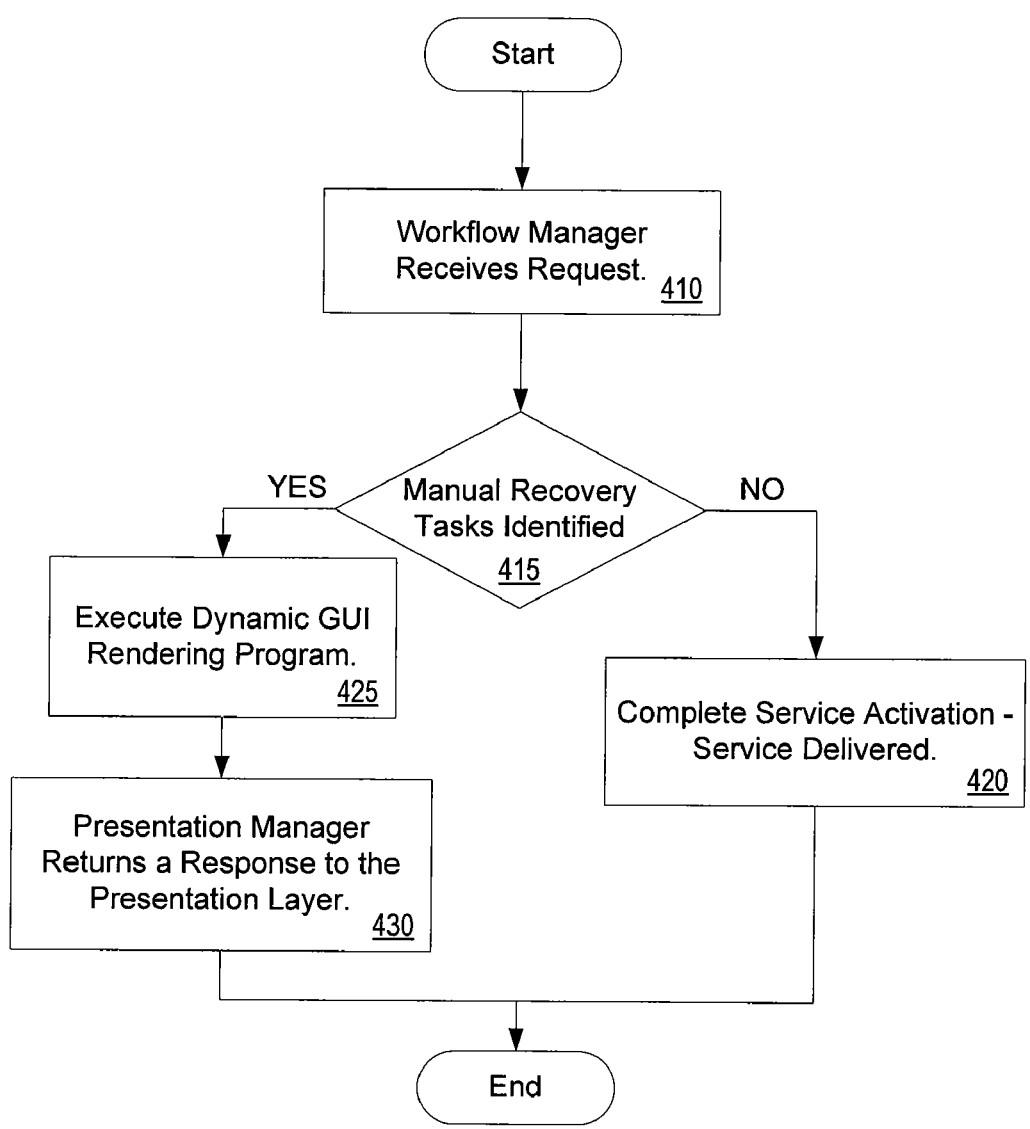
FIG. 4 shows the error handling process flow diagram.

FIG. 4 shows the error handling process flow diagram. When the workflow manager 120 receives a request (Act 410) the workflow manager retrieves service configuration information from the service configuration manager 213, and user profile information from the user profile manager 214 to determine whether recovery tasks 118 may require completion before activating service or completing a request (Act 415). If the workflow manager 120 determines that no recovery tasks require completion before service activation then the workflow manager 120 completes the service activation and the request (Act 420). In the event the workflow manager 120 determines that recovery tasks 118 may require completion before completing the request, then the workflow manager initiates execution of the dynamic GUI rendering program 136 (Act 425). The dynamic GUI rendering program 136 generates a task list and the GUI rendering 144, and delivers both to the presentation manager 212, which returns the results to the presentation layer (Act 430).

Figure 5:
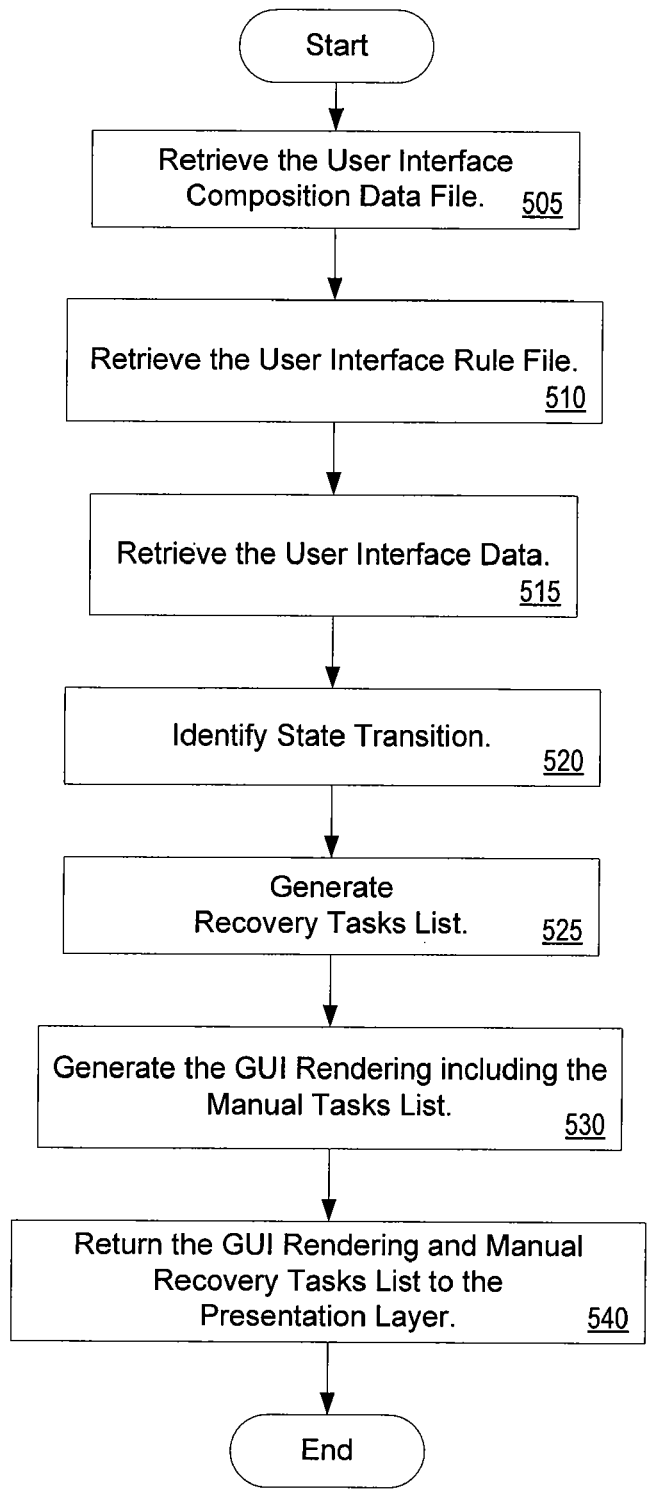
FIG. 5 shows acts that the EUC system may take to render a dynamic GUI.

FIG. 5 shows acts that the dynamic GUI rendering program may take to dynamically generate a GUI rendering. The user interface composition data file 138 and the user interface rules file 142 files may store the information that defines the tasks and sequence of workflow steps to perform to complete the state transition 116, and the start and end points of a transition. Accordingly, neither the presentation layer 200, nor the workflow manager 120 needs to maintain every possible sequence of workflow steps and every possible static GUI rendering 144. The business layer 210 may manage the user interface composition data file 138 and the user interface rules file 140 to configure the state transitions 116, and generate the dynamic GUI renderings 144. Customizations to the error handling and recovery tasks 118 may be isolated to the user interface composition data file 138 and the user interface rules file 140. When the workflow manager initiates execution of the dynamic GUI rendering program 136 the dynamic GUI rendering program 136 retrieves the user interface composition data file 138 (Act 505), and the user interface rule file 140 (Act 510), and the user interface data 175 (Act 520). The dynamic GUI rendering program 136 uses the retrieved data to identify the state transition 116 (Act 520), and generate recovery tasks 118 (Act 525). The dynamic GUI rendering program 136 then generates the dynamic GUI rendering 144 and returns both to the presentation layer 200 (Act 540).

Figure 6:
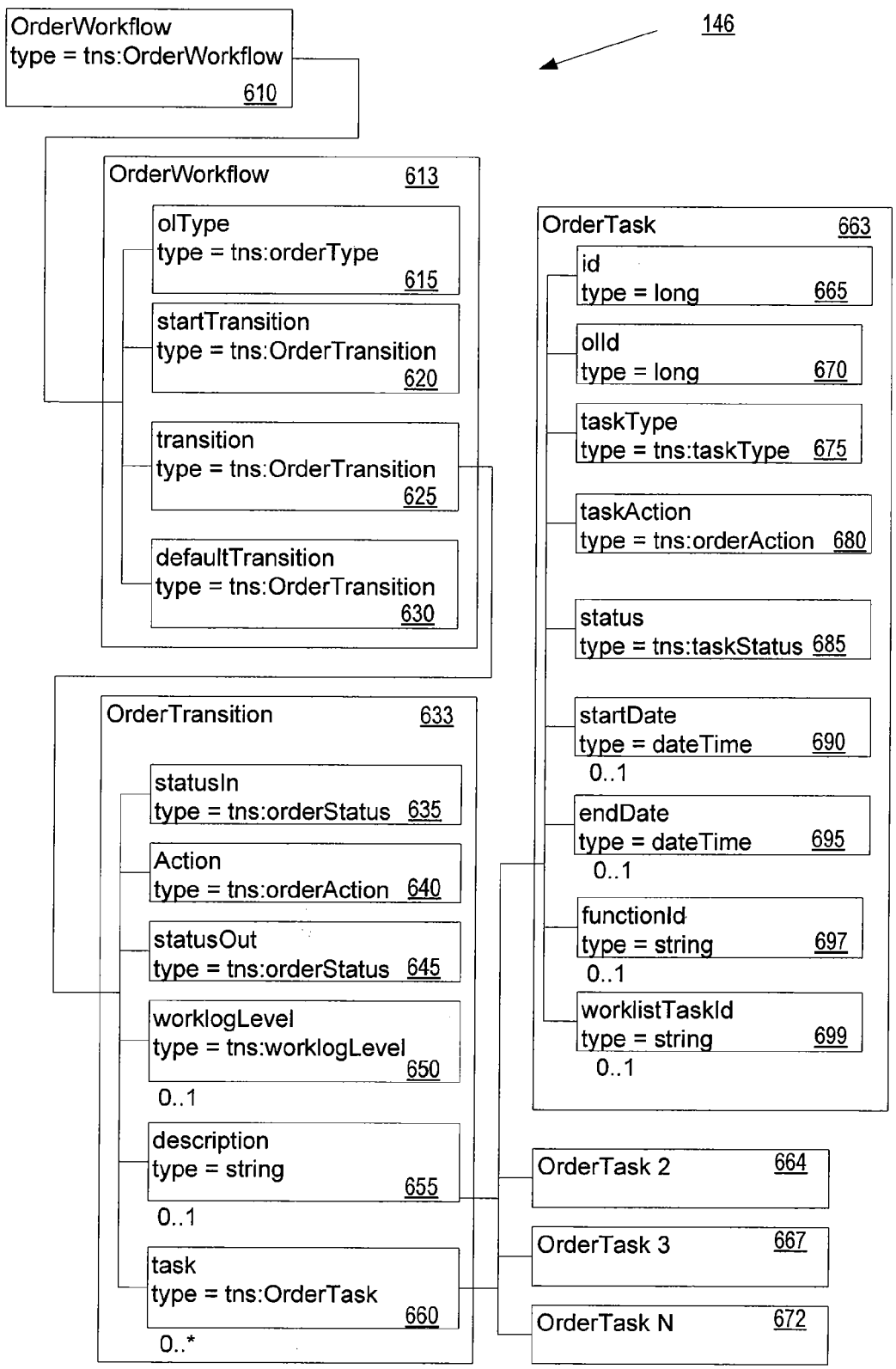
FIG. 6 shows a user interface composition data file.

FIG. 6 shows a user interface composition data file 146. In the example shown in FIG. 6, the user interface composition data file 146 uses an XML based structure that defines data used to render the GUI rendering 144, and includes an orderworkflow element 613, ordertransition element 633, and ordertask element 663. The orderworkflow element 613 may identify workflows to perform to complete a state transition 116, and the start and end points of the state transition. The ordertransition element 633 may identify one or more tasks to perform to complete a state transition 116. The ordertask element 663 may identify one or more tasks associated with the ordertransition element 633 to perform for a state transition 116.

The orderworkflow element 613 may include tags that identify: the service order or recovery tasks to manage, using the oltype tag 615; the start point for a state transition, using the starttransition tag 620; and the outstanding task or tasks of the workflow to complete, based on the starttransition tag 620, and the last action performed indicated by the action tag 640 of the transition tag 625 (i.e., state transition 116). In other words, for a given service order (i.e., request to provision service or recovery task) one or more workflows and state transitions maybe identified based on completed workflow steps and state transitions, where workflow steps include one or more state transitions including one or more tasks. The orderworkflow element 613 may also identify the default state transition, using defaulttransition tag 630, where a starttransition tag 620 and action tag 640 in combination does not indicate an alternative state transition.

The ordertransition element 633 may further identify the transition tag 625 (i.e., state transition 116); the current status of the state transition 116, using the statusin tag 635; the tasks to complete in order to pass from the status indicated by the statusin tag 635 to a statusout tag 645 status set to "complete"; and the action tag 640, which indicates the last action performed. The ordertransition element 633 may include a workloglevel tag 650 that defines whether to store a line of code, numerical values as codes or other information in the database as a log of the performed operation or task. The ordertransition element 633 also may include: a description of the state transition 116, using a description tag 655; and identify one or more tasks needed to complete the state transition 116, using the task tag 660. The statusin 635 tag, in combination with the action 640 tag, determine the state transition 116 by identifying the completed tasks, or alternatively the uncompleted tasks associated with the state transition 116. The ordertransition element 633 may specify whether a state transition includes multiple tasks, using multiple task tags 660.

The ordertask element 663 further defines the tasks identified by the task tag 660 of the ordertransition 633 element, and includes tags that identify: the type of task, either automatic or manual, using the tasktype tag 675; and actions associated with the task, using the taskaction tag 680 (e.g., set e-mail address or contact information). Table 2 shows an example taskaction tag to insert a new IP-PBX for system EMX, which the system may perform to complete a service order for a new IP-PBX.

TABLE 2 taskaction tag

```
<task>
    <id>0</id>
    <olId>0</olId>
    <type>AUTO</type>
    <action>insertNewIP-Pbx</action>
    <status>NEW</status>
    <functionId>ord.centralino.add</functionId>
    <worklistTaskId></worklistTaskId>
    <system>EMX</system>
    <flagBlocking>true</flagBlocking>
    <errorCondition>false</errorCondition>
    <additionalInfo>Automatic Pbx Insert</additionalInfo>
</task>
```

FIG. 7 shows a user interface rule file 142. After an error occurs or recovery task 118 requires a user interaction to complete a state transition 116, a composition data transformation 154 specific to the error identified in the user interface rule file 142 may be applied to user interface composition data 138 identified in the user interface composition data file 146 to generate a GUI rendering 144. Referring to Table 1 above that shows a work order 147 that identifies a work order physical site (i.e., xml-fragment/wor:physicalSite) and some of the physical site's attributes to which the user interface rule file 142 applies a composition data transformation 154. FIG. 7 illustrates a composition data transformation 154 that sets the background color to yellow and the font weight to bold for the user interface composition data 138 related to "xmlfragment/wor:physicalSite" identified in the work order 147 shown in Table 1.

In an alternate implementation, Table 3 shows user interface composition data 138 and user interface rules file data 140 combined in one XML to simplify development, deployment, and maintenance. In the alternate implementation, the combined user interface composition data 138 and user interface rules data 140 file, shown in Table 3, may include an element dinamicJspData that contains a rule that indicates that the IP-PBX data from the work order 147, displayed in a GUI rendering 144, may be modified by the user.

TABLE 3 combined user interface composition data 138 and
user interface rules file data 140 file

```
<?xml version="1.0" encoding="UTF-8" ?>
        <orderWorkflow   xmlns="http://abc.xyz.it/
schemas/orderStatusManager"xmlns:xsi="http://www.w3.org/
2001/XMLSchema-instance"xsi:schemaLocation="http://abc.xyz.it/
schemas/orderStatusManager
OrderStatusManager.xsd">
  <olType>addIpPbx</olType>
- <startTransition>
    <statusIn>statusInStartTransition</statusIn>
    <action>actionStartTransition</action>
    <statusOut>20</statusOut>
    <worklogLevel>0</worklogLevel>
    <description>VALIDATO ORDINE RICEVUTO
DA ATOM</description>
  </startTransition>
- <transition>
    <statusIn>any</statusIn>
    <action>gestioneEsplosioneDerivati</action>
    <statusOut>50</statusOut>
    <worklogLevel>0</worklogLevel>
    <description>GESTIONE ESPLOSIONE DERIVATI</description>
  - <task>
    <id>0</id>
    <olId>0</olId>
    <type>MANUAL</type>
    <action>completataEsplosioneDerivati</action>
    <status>NUOVO</status>
    <functionId>ord.gnr.explosion</functionId>
    <worklistTaskId />
    <system>EUC</system>
    <flagBlocking>true</flagBlocking>
    <errorCondition>false</errorCondition>
    <additionalInfo>ESPLOSIONE ARCHI</additionalInfo>
    </task>
  </transition>
- <transition>
    <statusIn>any</statusIn>
    <action>completataEsplosioneDerivati</action>
    <statusOut>60</statusOut>
    <worklogLevel>0</worklogLevel>
    <description>ESPLOSIONE DERIVATI COMPLETATA</description>
  </transition>
- <transition>
    <statusIn>any</statusIn>
    <action>gestioneCentralino</action>
    <statusOut>70</statusOut>
    <worklogLevel>0</worklogLevel>
    <description>GESTIONE CENTRALINO</description>
  - <task>
    <id>0</id>
    <olId>0</olId>
    <type>MANUAL</type>
    <action>inserimentoCentralino</action>
    <status>NUOVO</status>
    <functionId>ord.switchboard.management</functionId>
    <worklistTaskId />
    <system>EMX</system>
    <flagBlocking>true</flagBlocking>
    <errorCondition>false</errorCondition>
```

TABLE 3-continued combined user interface composition data 138 and
user interface rules file data 140 file

```
    <additionalInfo>INSERIMENTO CENTRALINO</additionalInfo>
    </task>
  </transition>
- <transition>
    <statusIn>any</statusIn>
    <action>preparazioneInterazioneConnettoreCmm</action>
    <statusOut>80</statusOut>
    <worklogLevel>0</worklogLevel>
    <description>PREPARAZIONE INTERAZIONE CMM</description>
  </transition>
- <transition>
    <statusIn>any</statusIn>
    <action>preparazioneInterazioneConnettoreEmx</action>
    <statusOut>90</statusOut>
    <worklogLevel>0</worklogLevel>
    <description>PREPARAZIONE INTERAZIONE EMX</description>
  </transition>
- <transition>
    <statusIn>any</statusIn>
    <action>centralinoCompleto</action>
    <statusOut>100</statusOut>
    <worklogLevel>0</worklogLevel>
    <description>CENTRALINO COMPLETO</description>
  </transition>
- <transition>
    <statusIn>any</statusIn>
    <action>gestioneUtenze</action>
    <statusOut>110</statusOut>
    <worklogLevel>0</worklogLevel>
    <description>GESTIONE UTENZE</description>
  - <task>
    <id>0</id>
    <olId>0</olId>
    <type>MANUAL</type>
    <action>gestioneUtenzeInCorso</action>
    <status>NUOVO</status>
    <functionId>ord.line.management.multiple</functionId>
    <worklistTaskId />
    <system>EUC</system>
    <flagBlocking>true</flagBlocking>
    <errorCondition>false</errorCondition>
    <additionalInfo>GESTIONE UTENZE</additionalInfo>
    </task>
  </transition>
- <transition>
    <statusIn>any</statusIn>
    <action>gestioneUtenzeInCorso</action>
    <statusOut>120</statusOut>
    <worklogLevel>0</worklogLevel>
    <description>GESTIONE UTENZE IN CORSO</description>
  </transition>
- <transition>
    <statusIn>any</statusIn>
    <action>gestioneIssw</action>
    <statusOut>64</statusOut>
    <worklogLevel>0</worklogLevel>
    <description>GESTIONE ISSW</description>
  - <task>
    <id>0</id>
    <olId>0</olId>
    <type>MANUAL</type>
    <action>gestioneIsswInCorso</action>
    <status>NUOVO</status>
    <functionId>ord.msem.management</functionId>
    <worklistTaskId />
    <system>EUC</system>
    <flagBlocking>true</flagBlocking>
    <errorCondition>false</errorCondition>
    <additionalInfo>GESTIONE ISSW</additionalInfo>
    </task>
  </transition>
```

TABLE 3-continued combined user interface composition data 138 and
user interface rules file data 140 file

```
- <transition>
    <statusIn>any</statusIn>
    <action>gestioneIsswInCorso</action>
    <statusOut>65</statusOut>
    <worklogLevel>0</worklogLevel>
    <description>GESTIONE ISSW IN CORSO</description>
  </transition>
- <transition>
    <statusIn>any</statusIn>
    <action>ordineCompletato</action>
    <statusOut>160</statusOut>
    <worklogLevel>0</worklogLevel>
    <description>ORDINE COMPLETATO</description>
  </transition>
- <transition>
    <statusIn>any</statusIn>
    <action>ordineAnnullato</action>
    <statusOut>170</statusOut>
    <worklogLevel>0</worklogLevel>
    <description>ORDINE ANNULLATO</description>
  </transition>
- <transition>
    <statusIn>any</statusIn>
    <action>emxAddCustomerException</action>
    <statusOut>*</statusOut>
    <worklogLevel>0</worklogLevel>
    <description>RECUPERO ERRORI DOVUTI ALL'INTERAZIONE
CON LA PIATTAFORMA EMX</description>
  - <task>
      <id>0</id>
      <olId>0</olId>
      <type>MANUAL</type>
      <action>gestioneEmxRespose</action>
      <status>NUOVO</status>
      <functionId>ord.exception.communication</functionId>
      <worklistTaskId />
      <system>EMX</system>
      <flagBlocking>true</flagBlocking>
      <errorCondition>true</errorCondition>
      <additionalInfo />
  - <dinamicJspData>
    - <type>
        <id>workOrder</id>
      - <section>
          <id>CUSTOMER</id>
          <changeable>true</changeable>
        </section>
      </type>
    </dinamicJspData>
    </task>
  </transition>
- <transition>
    <statusIn>any</statusIn>
    <action>emxAddIpPbxException</action>
    <statusOut>*</statusOut>
    <worklogLevel>0</worklogLevel>
    <description>RECUPERO ERRORI DOVUTI ALL'INTERAZIONE
CON LA PIATTAFORMA EMX</description>
  - <task>
      <id>0</id>
      <olId>0</olId>
      <type>MANUAL</type>
      <action>gestioneEmxRespose</action>
      <status>NUOVO</status>
      <functionId>ord.exception.communication</functionId>
      <worklistTaskId />
      <system>EMX</system>
      <flagBlocking>true</flagBlocking>
      <errorCondition>true</errorCondition>
      <additionalInfo />
  - <dinamicJspData>
    - <type>
        <id>workOrder</id>
      - <section>
          <id>IPPBX</id>
          <changeable>true</changeable>
        </section>
```

TABLE 3-continued combined user interface composition data 138 and
user interface rules file data 140 file

```
      </type>
    </dinamicJspData>
    </task>
  </transition>
- <transition>
    <statusIn>any</statusIn>
    <action>emxAddPhysicalSiteException</action>
    <statusOut>*</statusOut>
    <worklogLevel>0</worklogLevel>
    <description>RECUPERO ERRORI DOVUTI ALL'INTERAZIONE
CON LA PIATTAFORMA EMX</description>
  - <task>
      <id>0</id>
      <olId>0</olId>
      <type>MANUAL</type>
      <action>gestioneEmxRespose</action>
      <status>NUOVO</status>
      <functionId>ord.exception.communication</functionId>
      <worklistTaskId />
      <system>EMX</system>
      <flagBlocking>true</flagBlocking>
      <errorCondition>true</errorCondition>
      <additionalInfo />
    </task>
  </transition>
- <transition>
    <statusIn>any</statusIn>
    <action>emxAddLogicalSiteException</action>
    <statusOut>*</statusOut>
    <worklogLevel>0</worklogLevel>
    <description>RECUPERO ERRORI DOVUTI ALL'INTERAZIONE
CON LA PIATTAFORMA EMX</description>
  - <task>
      <id>0</id>
      <olId>0</olId>
      <type>MANUAL</type>
      <action>gestioneEmxRespose</action>
      <status>NUOVO</status>
      <functionId>ord.exception.communication</functionId>
      <worklistTaskId />
      <system>EMX</system>
      <flagBlocking>true</flagBlocking>
      <errorCondition>true</errorCondition>
      <additionalInfo />
    </task>
  </transition>
- <transition>
    <statusIn>any</statusIn>
    <action>gestioneEmxRespose</action>
    <statusOut>*</statusOut>
    <worklogLevel>0</worklogLevel>
    <description>LA GESTIONE DEGLI ERRORI DOVUTI
ALL'INTERAZIONE CON LA PIATTAFORMA EMX E' STATA
PORTATA A TERMINE</description>
  </transition>
- <defaultTransition>
    <statusIn>any</statusIn>
    <action>defaultTransition</action>
    <statusOut>*</statusOut>
    <worklogLevel>0</worklogLevel>
    <description>QUESTA OPERAZIONE NON GENERA
NESSUN EFFETTO</description>
  </defaultTransition>
</orderWorkflow>
```

Figure 8:
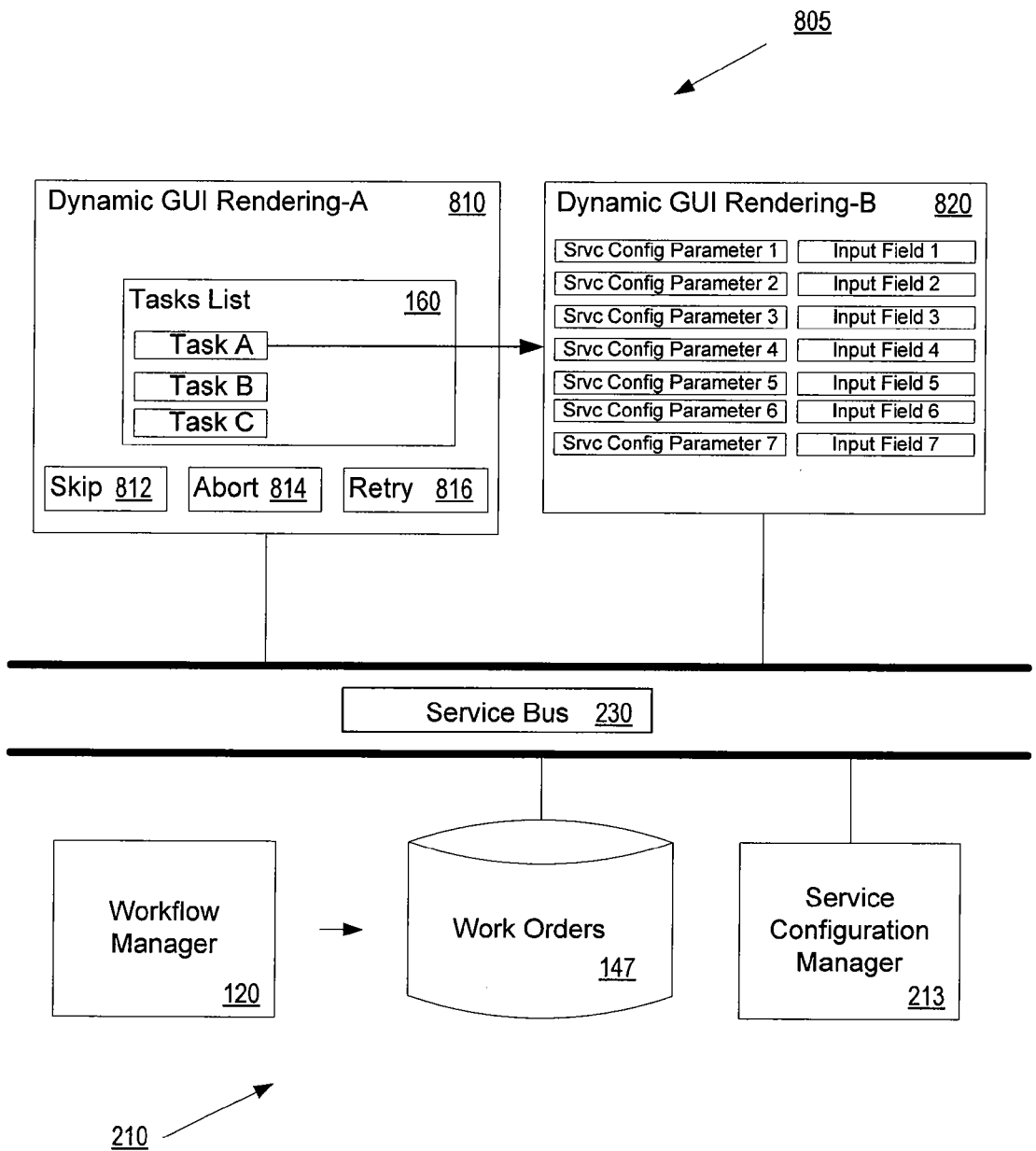
FIG. 8 shows dynamic GUI renderings.

FIG. 8 shows dynamic GUI renderings 805. The dynamic GUI renderings 805 may include interface elements to perform the operations to recover the error (e.g. a Skip element 812, an Abort element 814, and a Retry element 816). Dynamic GUI renderings 805 may result from the workflow manager 120 updating work order 147 parameters and state information, and processing information from the service configuration manager 213 to determine which processes and workflow steps to activate, or enable or disable, to complete work orders. Dynamic GUI renderings 805 may result from the workflow manager 120, in coordination with the error handling subsystem 112, generating user tasks lists 160 and GUI renderings (e.g., dynamic GUI rendering—A 810 and dynamic GUI rendering—B 820) to assist a user to resolve errors or conditions requiring user interactions, which ultimately result in the activation of IP Multimedia services. The workflow manager 120 may generate the dynamic GUI rendering—A 810 with tasks list 160 after retrieving the most current service configuration requirements from the service configuration manager 213, and thereby identifying the state transition 116. Configuration changes at the integration layer 220 (e.g., a new network element 226 implemented at the integration layer 220 that replaces a prior network element, and requires different, fewer or more configuration information than the prior network element) may be realized dynamically by the workflow manager 120, so that the GUI rendering—A 810 reflects such changes dynamically.

A user may select a task (e.g., Task A) from the tasks list 160 that causes the workflow manager 120 to generate another GUI rendering (e.g., dynamic GUI rendering—B 820) that presents service configuration parameters to a user for validation (e.g., Srvc Config Parameter 1-7) or customization (e.g., Input Field 1-7). The workflow manager 120 may generate the dynamic GUI rendering only after determining the currently required service configuration information 126, rules, user input fields, actions, and state transition 116. For example, the EUC system 102 may integrate a new or alternative network service through a recently integrated network element 226 that requires the user to self-provision the service differently from a prior procedure for requesting service activation. Although one or more different or entirely new workflows, tasks or service configuration parameters require user interaction, the GUI renderings 144 adapt, without requiring programming changes at the presentation layer 200. The presentation layer 200, and the workflow manager 120 do not need to maintain every possible sequence of workflow steps, tasks list 160 and every possible GUI renderings. The EUC system 102 may present new network services to users, while isolating development to the integration layer 220 and hiding the complexity of the network entirely from the user.

Figure 9:
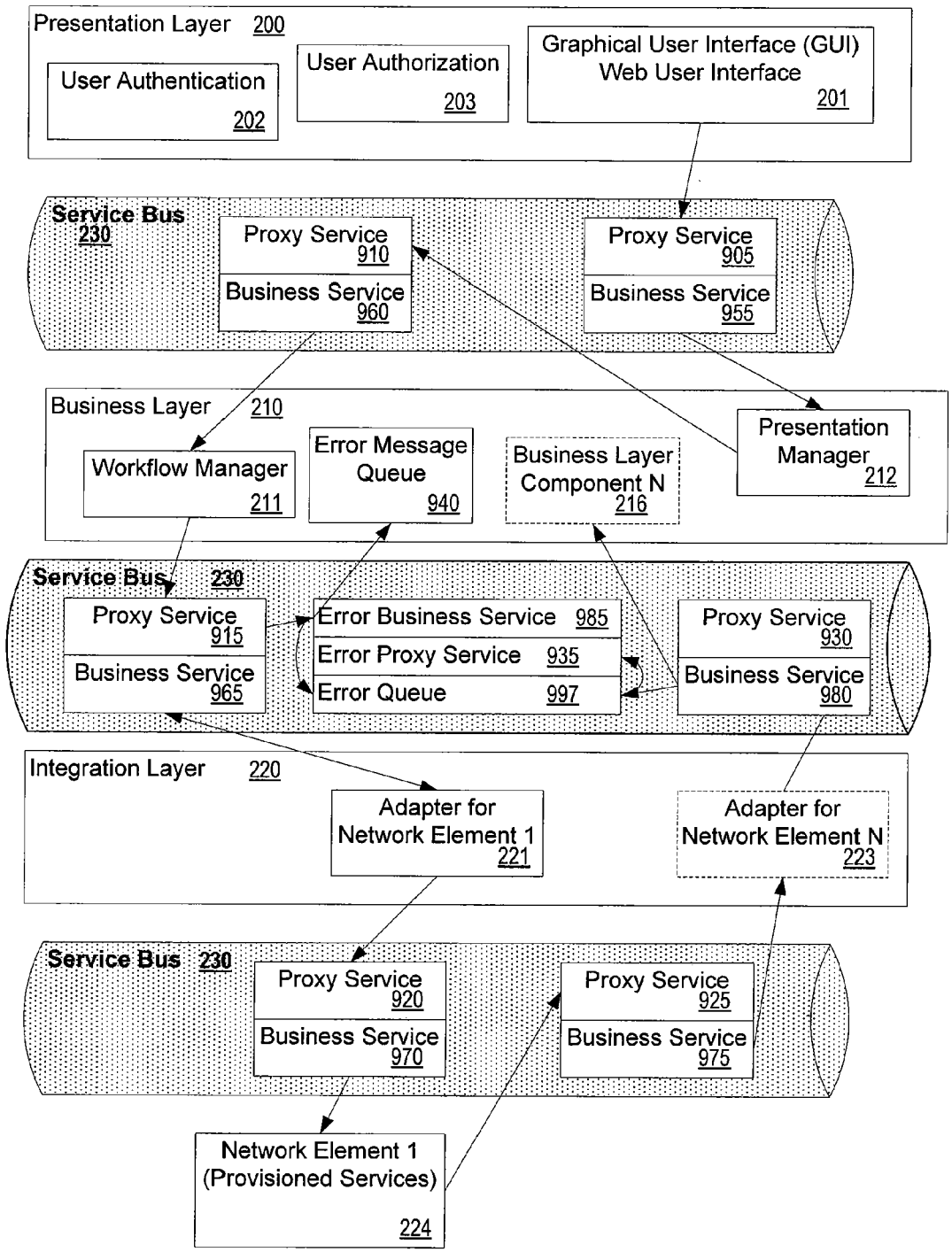
FIG. 9 shows a service bus flow diagram.

FIG. 9 shows a service bus layer separation. The service bus 230 may manage communications between the presentation layer 200, business layer 210 and integration layer 220. The service bus 230 hides the complexity of managing and provisioning network elements 226, facilitates isolating development and testing of components at each layer, and thereby, improves service deployment time and service levels. The service bus 230 may provide protocol switching, content routing and message transformation functionalities using multiple configurable proxy services 905-935, and corresponding business services 955-985. The service bus 230 may manage communication between the business layer components, either synchronously (SOAP/http) or asynchronously (JMS) using the proxy services 905-935 and corresponding business services 955-985.

The service bus may simulate integration layer adapters, based on standard web services. The service bus may deploy stub adapters (simulator proxy services) to facilitate development of business logic, and substitute production adapters for the stub adapters once development has completed, and thereby isolating impacts to the service bus configuration. Accordingly, the EUC system 102 may configure the service bus to call the operational adapter (real external system, i.e., network element), after successful completion of integration testing, without modifying components at the business layer and without modifying the real adapter at the integration layer.

The service bus 230 also may manage timeouts and retries that occur during communication between the business layer 210 and the integration layer 220, and call-backs from the integration layer 220 to the business layer 210. When a request (call) from a business layer component to an adapter 222 times out while waiting for an acknowledgement from the adapter 222, the service bus 230 may automatically resend the request (call) for a configurable number of times. When an asynchronous response (call-back) from an adapter 222 to the business layer 210 times out, the service bus 230 may automatically resend the response back to the business layer 210 for a configurable number of times. The service bus 230 also manages time outs and retries that occur while in communication with the network elements 226, a configurable number of times.

Figure 10:
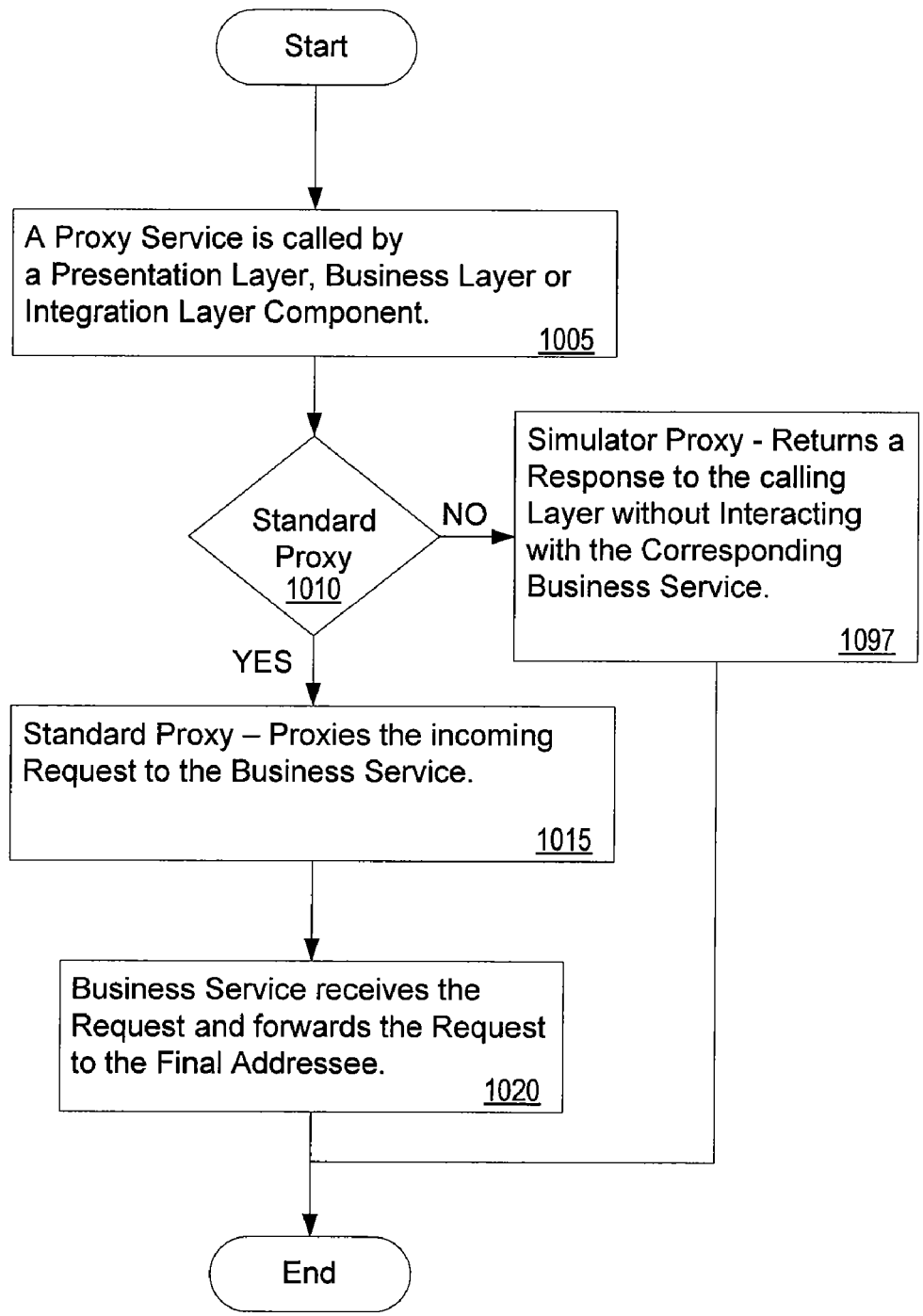
FIG. 10 shows a service bus layer separation.

FIG. 10 shows a service bus flow diagram. When a presentation layer component, business layer component or integration layer component calls one of the proxy services 905-930 (Act 1005), the proxy service may operate in one of at least two configurable modes, namely as a standard proxy or a simulator proxy. If the Standard proxy service receives a request (Act 1015) then the proxy service may proxy the incoming request to the corresponding business service (Act 1015), which receives the request and forwards the request to the final addressee (Act 1020). If a Simulator proxy service receives a request the proxy service may return a response to the calling layer without interacting with the corresponding business service (Act 1097).

The EUC system 102 and remote user device 134 may include general purpose computing devices in the form of a conventional computing environment (e.g., personal computer, a laptop, mobile device, or personal digital assistant), including a processing unit, a system memory, and a system bus that couples various system components including the system memory to the processing unit. The processing unit may perform arithmetic, logic, and control operations by accessing system memory. The system memory may store information and instructions for use in combination with the processing unit. The system memory may include volatile and non-volatile memory, such as random access memory (RAM) and read only memory (ROM). A basic input/output system (BIOS) containing the basic routines that help transfer information between elements within the personal computer, such as during start-up, may be stored in ROM. The system bus may be any of several types of bus structures including a memory bus or memory controller, a peripheral bus, and a local bus using any of a variety of bus architectures.

The end user control configuration (EUC) system with dynamic user interface 102 and remote user device 134 may further include a hard disk drive for reading from and writing to a hard disk, and an external disk drive for reading from or writing to a removable disk. The removable disk may be a magnetic disk for a magnetic disk driver or an optical disk such as a CD ROM for an optical disk drive. The hard disk drive and external disk drive are connected to the system bus by a hard disk drive interface and an external disk drive interface, respectively. The drives and their associated computer-readable media provide non-volatile storage of computer readable instructions, data structures, program modules and other data for the personal computer. The relevant data may be organized in a database, for example in a relational or object database.

It should be appreciated by those skilled in the art that the computing environment presently described may include any type of computer readable media which can store data accessible by a computer, such as magnetic cassettes, flash memory cards, digital video disks, random access memories, read only memories, and the like, may also be used in the exemplary computing environment.

A number of program modules may be stored on a hard disk, external disk, ROM or RAM, including an operating system, one or more application programs, other program modules, and program data. The application programs may include at least a part of the functionality as indicated in FIGS. 1 through 10.

A user may enter commands and information, as discussed above, into the graphical user interface (GUI) 120 through input devices such as a keyboard and mouse. Other input devices may include a microphone (or other sensors), joystick, game pad, scanner, or the like. These and other input devices may be connected to the processing unit 104 through a serial port interface coupled to the system bus, or may be connected by other interfaces, such as a parallel port interface, wireless communication device such as a modem, game port, or a universal serial bus (USB). Further, information may be printed using a printer. The printer, and other parallel input/output devices, may be connected to the processing unit through parallel port interface. An interface also connects a monitor or other type of display device to the system bus, such as a video input/output. In addition to the monitor, the computing environment may include other peripheral output devices, such as speakers or other audible or visual output.

The computing environment may communicate with other electronic devices, wired or wireless, such as a computer, telephone, personal digital assistant, television, or the like. To communicate, the computer environment may operate in a networked environment using connections to one or more electronic devices. The computer environment may also be networked with a remote computer. The remote computer may be another computing environment such as a server, a router, a network PC, a peer device, or other common network node, and may include many or all of the elements described above relative to the computing environment. The logical connections may include a local area network (LAN) and a wide area network (WAN). Such networking environments are commonplace in offices, enterprise-wide computer networks, intranets and the Internet. The network connections shown are examples only, and other logic for establishing a communications link between the electronic devices may be used. The above-described computing system is only one example of the type of computing system that may be used to implement the EUC system 102.

A number of implementations have been described. Nevertheless, it will be understood that various modifications may be made without departing from the spirit and scope of the invention. Accordingly, other implementations are within the scope of the following claims.

What is claimed is:

1. An end user control configuration system comprising:
a processor;
a memory in communication with the processor and comprising, for execution by the processor:
  a presentation layer that manages interactions with an end user;
  a business layer comprising a first business service for provisioning a first service, a second business service for provisioning a second service, an error handling engine, and a workflow manager;
  a communication interface in communication with the error handling engine and the workflow manager, where:
    the error handling engine is responsive to an exception for a provisioning task by queuing a workflow process error in an error message queue; and
    the workflow manager is operable to retrieve the workflow process error from the error message queue, obtain service configuration information for the provisioning task, analyze the service configuration information and the workflow process error, and generate a user interface composition data file specifying a state transition associated with a recovery task for completion by the end user;
  a service bus providing communication between the presentation layer, and the business layer, where the service bus comprises:
    a first proxy service configured to operate in a first interaction mode that forwards a first received request to provision the first service to the first business service; and
    a second proxy service configured to operate in a second interaction mode that returns an acknowledgement responsive to a second received request to provision the second service, without interacting with the second business service, when the service bus identifies that the second service is unavailable; and
  a user interface rendering receiver in the presentation layer operable to:
    receive the user interface composition data file through the service bus, and responsively generate a graphical user interface rendering that facilitates the state transition of the recovery task by the end user.

2. The end user control configuration system of claim 1, where the workflow manager is further operable to coordinate communication of the graphical user interface rendering to the user interface rendering receiver.

3. The system of claim 1, where the user interface composition data file comprises:
visible data for the graphical user interface rendering;
modifiable data for the graphical user interface rendering; or
data names for composing the graphical user interface rendering; or any combination thereof.

4. The system of claim 1, where the user interface composition data file establishes:
composition data for the graphical user interface rendering; and
the state transition associated with the recovery task for the graphical user interface rendering.

5. The system of claim 1, further comprising:
an integration layer in communication with the service bus, the integration layer configured to implement end user configuration selections for the first service, where the first business service is operable to forward the service request to a final addressee.

6. The system of claim 5, where the business layer further comprises a GUI rendering component comprising a dynamic graphical user interface rendering program operable to:
retrieve the user interface composition data specifying the state transition;
retrieve user interface rule data specifying a composition data transformation; and
generate the graphical user interface rendering for the state transition for end user control by applying the user interface rule data applied to the user interface composition data thereby implementing a composition data transformation in the graphical user interface rendering for the state transition.

7. The system of claim 6, where the GUI rendering component is operable to communicate the GUI rendering for display through the service bus to the presentation layer.

8. The system of claim 5, where the business layer further comprises an error message queue operable to store an error message arising from exceptions generated during communication between the business layer and the integration layer, or between the business layer and the presentation layer, or both.

9. The system of claim 8, where the business layer is further operable to process the error message and determine the state transition.

10. A method for dynamically generating a graphical user interface (GUI), the method comprising:
 determining, by a processor, a state transition associated with recovery tasks for end user completion;
 obtaining user interface data specifying the state transition;
 retrieving user interface composition data from a database;
 generating, by the processor, a user interface composition data file;
 retrieving a user interface rule file;
 establishing, by the processor, a service bus configured to provide communication between a presentation layer that manages interactions with an end user, and a business layer, comprising a first business service for provisioning a first service, a second business service for provisioning a second service, an error handling engine, and a workflow manager, the service bus comprising:
  a first proxy service configured to operate in a first interaction mode that forwards a first received request to provision the first service to the first business service; and
  a second proxy service configured to operate in a second interaction mode that returns an acknowledgement responsive to a second received request to provision the second service, without interacting with the second business service, when the service bus identifies that the second service is unavailable; and
 receiving, by a user interface rendering receiver in the presentation layer, the user interface composition data file through the service bus, and responsively
 generating, by the processor, a graphical user interface rendering that facilitates the state transition of the recovery task by the end user.

11. The method of claim 10, where:
 retrieving the user interface composition data file, the interface rule file, or both, comprises:
  retrieving visible data for the graphical user interface rendering;
  retrieving modifiable data for the graphical user interface rendering; and
  retrieving data names for composing the graphical user interface rendering.

12. The method of claim 10, where retrieving the user interface composition data file, the interface rule file, or both, comprises:
 retrieving composition data for the graphical user interface rendering; and
 retrieving state transitions for the graphical user interface rendering.

13. The method of claim 10, further comprising:
 establishing an integration layer in communication with the service bus, the integration layer configured to implement end user configuration selections for the first service,
 where the first business service is operable to forward the service request to a final addressee.

14. The method of claim 13, where establishing the service bus comprising the business layer further comprises establishing a GUI rendering component comprising a dynamic graphical user interface rendering program operable to:
 retrieve the user interface composition data specifying the state transition;
 retrieve user interface rule data specifying a composition data transformation; and
 generate the graphical user interface rendering for the state transition for end user control by applying the user interface rule data applied to the user interface composition data thereby implementing a composition data transformation in the graphical user interface rendering for the state transition.

15. The method of claim 14, further comprising communicating the graphical user interface rendering for display through the service bus to the presentation layer.

16. A product comprising:
 a computer memory;
 logic stored on the computer memory that when executed by a processor cause the processor to:
  determine a state transition associated with recovery tasks for end user completion;
  obtain user interface data specifying the state transition;
  retrieve a user interface composition data file;
  retrieve a user interface rule file;
  establish a service bus configured to provide communication between a presentation layer that manages interactions with an end user, and a business layer, comprising a first business service for provisioning a first service, a second business service for provisioning a second service, an error handling engine, and a workflow manager, the service bus comprising:
   a first proxy service configured to operate in a first interaction mode that forwards a first received request to provision the first service to the first business service; and
   a second proxy service configured to operate in a second interaction mode that returns an acknowledgement responsive to a second received request to provision the second service, without interacting with the second business service, when the service bus identifies that the second service is unavailable; and
  receive, by a user interface rendering receiver in the presentation layer, the user interface composition data file through the service bus and responsively generate a graphical user interface rendering that facilitates the state transition of the recovery task by the end user.

17. The product of claim 16, where the logic is operable to:
 retrieve visible data for the graphical user interface rendering;
 retrieve modifiable data for the graphical user interface rendering; and
 retrieve data names for composing the graphical user interface rendering.

18. The product of claim 16, where the logic is operable to:
 retrieve composition data for the graphical user interface rendering; and
 retrieve state transitions for the graphical user interface rendering.

19. The product of claim 16, where the logic is further operable to cause the processor to:
 establish an integration layer in communication with the service bus, the integration layer configured to implement end user configuration selections for the first service,
 where the first business service is operable to forward the service request to a final addressee.

20. The product of claim 19, where the logic causes the processor to establish a GUI rendering component comprising a dynamic graphical user interface rendering program operable to:
- retrieve the user interface composition data specifying the state transition;
- retrieve user interface rule data specifying a composition data transformation; and
- generate the graphical user interface rendering for the state transition for end user control by applying the user interface rule data applied to the user interface composition data thereby implementing a composition data transformation in the graphical user interface rendering for the state transition.

21. The product of claim 20, where the logic is further operable to cause the processor to communicate the graphical user interface rendering for display through the service bus to the presentation layer.

* * * * *